(12) United States Patent
Park et al.

(10) Patent No.: US 11,418,740 B2
(45) Date of Patent: Aug. 16, 2022

(54) ELECTRONIC DEVICE AND METHOD FOR DETERMINING TYPE OF LIGHT SOURCE OF IMAGE

(71) Applicant: Samsung Electronics Co., Ltd., Gyeonggi-do (KR)

(72) Inventors: Juhee Park, Gyeonggi-do (KR); Kyongtae Park, Gyeonggi-do (KR); Hongseob Shin, Gyeonggi-do (KR); Jeongwon Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/255,112

(22) PCT Filed: Jun. 10, 2019

(86) PCT No.: PCT/KR2019/006945
§ 371 (c)(1),
(2) Date: May 18, 2021

(87) PCT Pub. No.: WO2019/245208
PCT Pub. Date: Dec. 26, 2019

(65) Prior Publication Data
US 2021/0297613 A1   Sep. 23, 2021

(30) Foreign Application Priority Data
Jun. 22, 2018 (KR) .................. 10-2018-0072361

(51) Int. Cl.
*H04N 5/369* (2011.01)
*H04N 5/345* (2011.01)
*H04N 5/347* (2011.01)

(52) U.S. Cl.
CPC ........... *H04N 5/3696* (2013.01); *H04N 5/345* (2013.01); *H04N 5/347* (2013.01)

(58) Field of Classification Search
CPC ....... H04N 5/3696; H04N 5/345; H04N 5/347
See application file for complete search history.

(56) References Cited

U.S. PATENT DOCUMENTS

| 7,969,480 B2 | 6/2011 | Kim et al. |
| 8,503,771 B2 | 8/2013 | Masato |
| (Continued) | | |

FOREIGN PATENT DOCUMENTS

| KR | 20100011772 | 2/2010 |
| KR | 20110017274 | 2/2011 |
| (Continued) | | |

OTHER PUBLICATIONS

PCT/ISA/210 Search Report issued on PCT/KR2019/006945, dated Oct. 23, 2019, pp. 5.

(Continued)

*Primary Examiner* — Antoinette T Spinks
(74) *Attorney, Agent, or Firm* — The Farrell Law Firm, P.C.

(57) ABSTRACT

An electronic device is disclosed. The electronic device includes at least one processor electrically connected with an image sensor and a memory. The memory stores instructions, when executed, causing the processor to obtain an image through the image sensor, segment the obtained image into the plurality of regions, calculate values of a first parameter for each of the plurality of regions based on the reference color components indicating a representative color of each of the plurality of regions, calculate values of a second parameter for each of the plurality of regions based on first pixel values output from the plurality of first light receiving elements included in each of the plurality of regions and second pixel values output from the plurality of second light receiving elements, determine a type of a light source corresponding to each of the plurality of regions, based on a value of the second reference parameter included (Continued)

in data about the correlationship corresponding to the calculated values of the first parameter and values of the second parameter calculated for each of the plurality of regions, and determine a type of a light source of the image based on the determined types of the light source. In addition, various other embodiments recognized from the specification are also possible.

11 Claims, 18 Drawing Sheets

(56) References Cited

U.S. PATENT DOCUMENTS

| | | |
|---|---|---|
| 9,571,760 B2 | 2/2017 | Kang et al. |
| 10,306,198 B2 | 5/2019 | Park et al. |
| 10,339,672 B2 | 7/2019 | Park et al. |
| 2010/0020192 A1 | 1/2010 | Kim et al. |
| 2012/0155753 A1 | 6/2012 | Masato |
| 2014/0347532 A1 | 11/2014 | Kang et al. |
| 2017/0330348 A1 | 11/2017 | Park et al. |
| 2018/0091790 A1 | 3/2018 | Park et al. |
| 2019/0394440 A1* | 12/2019 | Wang ................ H04N 9/73 |

FOREIGN PATENT DOCUMENTS

| | | |
|---|---|---|
| KR | 20110017274 A * | 2/2011 |
| KR | 20120069539 | 6/2012 |
| KR | 20140136727 | 12/2014 |
| KR | 20170127638 | 11/2017 |
| KR | 20180033003 | 4/2018 |

OTHER PUBLICATIONS

PCT/ISA/237 Written Opinion issued on PCT/KR2019/006945, dated Oct. 23, 2019, pp. 5.

* cited by examiner

ELECTRONIC DEVICE AND METHOD FOR DETERMINING TYPE OF LIGHT SOURCE OF IMAGE

PRIORITY

This application is a National Phase Entry of PCT International Application No. PCT/KR2019/006945 which was filed on Jun. 10, 2019, and claims priority to Korean Patent Application No. 10-2018-0072361, which was filed on Jun. 22, 2018, the entire contents of each of which is incorporated herein by reference.

TECHNICAL FIELD

Embodiments disclosed in the disclosure relate to technologies of determining a type of a light source of an image.

BACKGROUND ART

With the advancement of IT technology, a camera has developed from a traditional film camera to a digital camera. The digital camera may convert light into an electrical image signal and may store the electrical image signal as digital data (image data).

Unlike a conventional film camera, the digital camera may perform white balancing for correction to a unique neutral color of a subject, with regard to a color temperature of light applied to the subject upon image capture. In general, the white balancing technique tracks achromatic color regions in some or all of pixels of the captured image and adjusts a color temperature of the entire image with respect to pixel values of the achromatic color regions.

DISCLOSURE

Technical Problem

According to a conventional white balancing technique, because a color of a light source and a unique color of a subject are mixed in an image obtained by capturing the subject, it is impossible to estimate an accurate type and an accurate color temperature of the light source. Furthermore, when using the general white balancing technique, because each algorithm should be formed with regard to each of a method for determining a typical light source and a method for determining an exceptional light source, there is a problem that computational resources of an electronic device are excessively used.

Embodiments disclosed in the disclosure may provide an electronic device and a method for more accurately determining a type of a light source of an image using an image sensor where a plurality of light receiving elements are included in a unit pixel.

Technical Solution

In accordance with an aspect of the disclosure, an electronic device is provided. The electronic device may include an image sensor including a pixel array, the pixel array including a plurality of pixels including a plurality of first light receiving elements and a plurality of second light receiving elements and each of the plurality of pixels including at least one of the plurality of first light receiving elements and at least one of the plurality of second light receiving elements, at least one processor electrically connected with the image sensor, and a memory storing data about correlationship between a value of at least one first reference parameter based on reference color components indicating a color and a value of a second reference parameter based on pixel values output from each of the first light receiving elements and the second light receiving elements, the pixel values forming the color. The data about the correlationship may correspond to each of a plurality of segmented regions of an image obtained through the image sensor and a type of a predefined light source. The memory may store instructions, when executed, causing the processor to obtain the image through the image sensor, segment the obtained image into the plurality of regions, calculate values of a first parameter for each of the plurality of regions based on the reference color components indicating a representative color of each of the plurality of regions, calculate values of a second parameter for each of the plurality of regions based on first pixel values output from the plurality of first light receiving elements included in each of the plurality of regions and second pixel values output from the plurality of second light receiving elements, determine types of a light source respectively corresponding to the plurality of regions, based on a value of the second reference parameter included in the data about the correlationship, the value corresponding to the calculated values of the first parameter, and the values of the second parameter calculated for each of the plurality of regions, and determine a type of a light source of the image based on the determined types of the light source.

In accordance with another aspect of the disclosure, a method for determining a light source of an image is provided. The method may include obtaining an image by means of an image sensor including a plurality of pixels, each of which includes a first light receiving element and a second light receiving element, segmenting the obtained image into a plurality of regions, calculating values of a first parameter for each of the plurality of regions based on reference color components indicating a representative color of each of the plurality of regions, calculating values of a second parameter for each of the plurality of regions based on first pixel values output from the first light receiving element included in each of the plurality of regions and second pixel values output from the second light receiving element, determining types of a light source respectively corresponding to the plurality of regions, based on values of the second parameter included in data about correlationship stored in a memory, the values corresponding to the calculated values of the first parameter, and the calculated values of the second parameter, and determining a type of a light source of the image based on the determined types of the light source respectively corresponding to the regions.

In accordance with another aspect of the disclosure, an electronic device is provided. The electronic device may include an image sensor including a plurality of pixels, each of at least some of the plurality of pixels including a plurality of light receiving elements, a memory, and a processor. The processor may be configured to obtain an image using the image sensor, segment at least a portion of the image into a plurality of regions, calculate values of at least one first parameter for every the plurality of regions based on reference color components indicating a representative color of each of the plurality of regions, calculate values of a second parameter corresponding to each of the plurality of regions using first pixel values corresponding to some of the plurality of light receiving elements of each of the plurality of regions and second pixel values corresponding to some of the plurality of light receiving elements, determine types of a light source corresponding to the plurality of regions, based on comparison between the values of the first parameter and the values of the second parameter and data about correlationship of the first parameter and the second parameter corresponding to specified light sources, and correct white balance of the image, based on the determined one or more type of the light sources corresponding to the plurality of regions.

Advantageous Effects

According to embodiments disclosed in the disclosure, a type of a light source of an image may be more accurately determined by determining the type of the light source for each image region.

The image may be segmented into a plurality of regions and pixel binning may be performed for each region to reduce an error rate of determining a type of a light source.

In addition, various effects ascertained directly or indirectly through the disclosure may be provided.

With regard to description of drawings, the same or similar denotations may be used for the same or similar components.

MODE FOR INVENTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
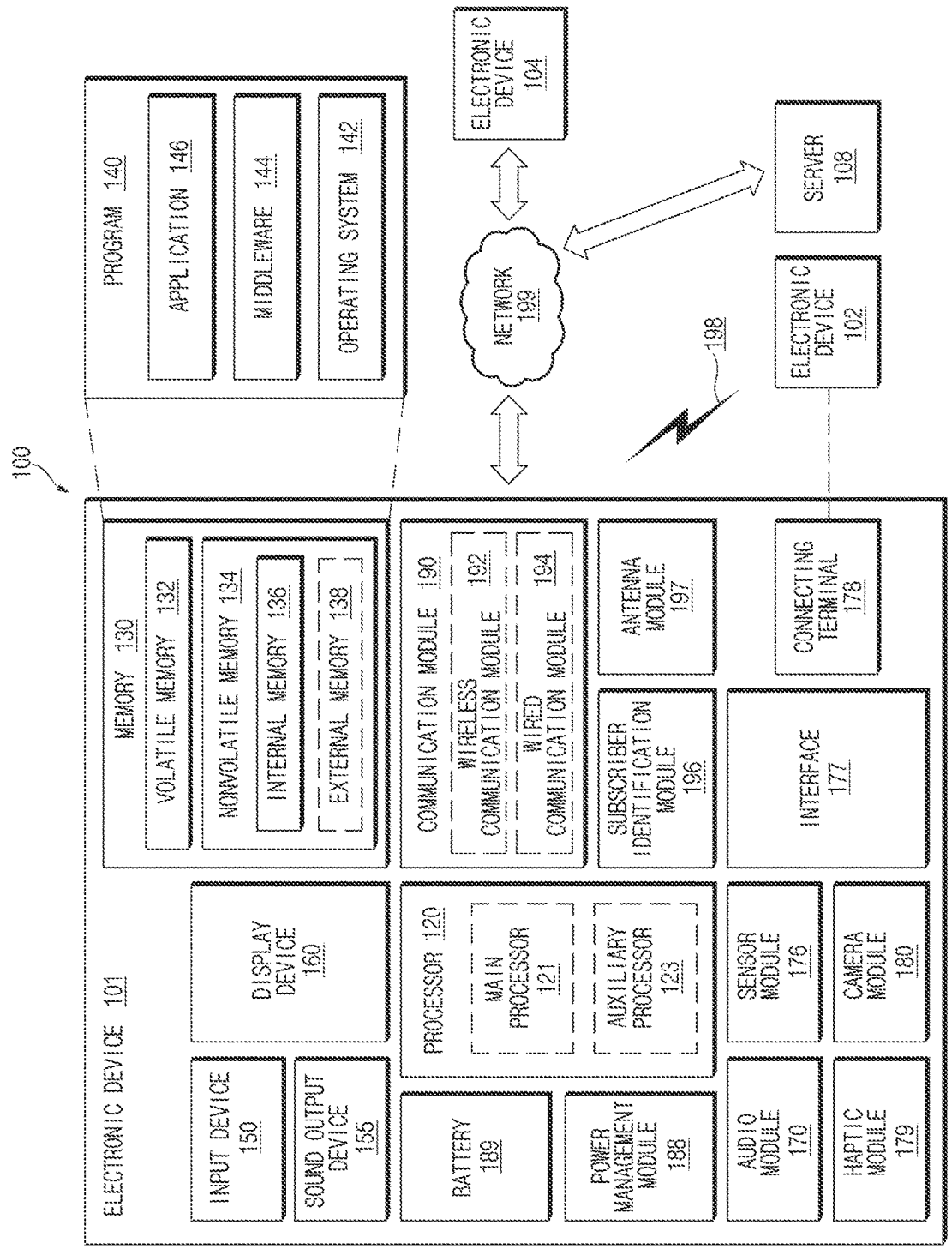
FIG. 1 is a block diagram illustrating an electronic device in a network environment, according to various embodiments.

FIG. 1 is a block diagram of an electronic device 101 in a network environment 100 according to various embodiments. Referring to FIG. 1, the electronic device 101 may communicate with an electronic device 101a through a first network 198 (e.g., a short-range wireless communication network) or may communicate with an electronic device 101b or a server 103 through a second network 199 (e.g., a long-distance wireless communication network) in a network environment 100. According to an embodiment, the electronic device 101 may communicate with the electronic device 101b through the server 103. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121 or with the main processor 121. Additionally or alternatively, the auxiliary processor 123 may use less power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, a kernel 142, a middleware 144, or an application 146.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through the sound output device 155 or an external electronic device (e.g., the electronic device 101a (e.g., a speaker or a headphone)) directly or wirelessly connected to the electronic device 101.

The sensor module 176 may generate an electrical signal or a data value corresponding to an operating state (e.g., power or temperature) inside or an environmental state (e.g., a user state) outside the electronic device 101. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 101a). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 101a). According to an embodiment, the connecting terminal 178 may include, for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, image signal processors, or flashes.

The power management module 188 may manage power supplied to the electronic device 101. According to an embodiment, the power management module 188 may be implemented as at least a part of a power management integrated circuit (PMIC).

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 101a, the electronic device 101b, or the server 103) and support communication execution through the established communication channel. The communication module 190 may include at least one communication processor operating independently from the processor 120 (e.g., the application processor) and supporting the direct (e.g., wired) communication or the wireless communication. According to an embodiment, the communication module 190 may include a wireless communication module (or a wireless communication circuit) 192 (e.g., a cellular communication module, a short-range wireless communication module, or a GNSS (global navigation satellite system) communication module) or a wired communication module 194 (e.g., an LAN (local area network) communication module or a power line communication module). The corresponding communication module among the above communication modules may communicate with the external electronic device through the first network 198 (e.g., the short-range communication network such as a Bluetooth, a Wi-Fi direct, or an IrDA (infrared data association)) or the second network 199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside (e.g., an external electronic device). According to an embodiment, the antenna module may include one antenna including a radiator made of a conductor or conductive pattern formed on a substrate (e.g., a PCB). According to an embodiment, the antenna module 197 may include a plurality of antennas. In this case, for example, the communication module 190 may select one antenna suitable for a communication method used in the communication network such as the first network 198 or the second network 199 from the plurality of antennas. The signal or power may be transmitted or received between the communication module 190 and the external electronic device through the selected one antenna. According to some embodiments, in addition to the radiator, other parts (e.g., a RFIC) may be further formed as a portion of the antenna module 197.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 101b through the server 103 connected to the second network 199. Each of the electronic devices 101a and 101b may be the same or different types as or from the electronic device 101. According to an embodiment, all or some of the operations performed by the electronic device 101 may be performed by one or more external electronic devices among the external electronic devices 101a, 101b, or 103. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

Figure 2:
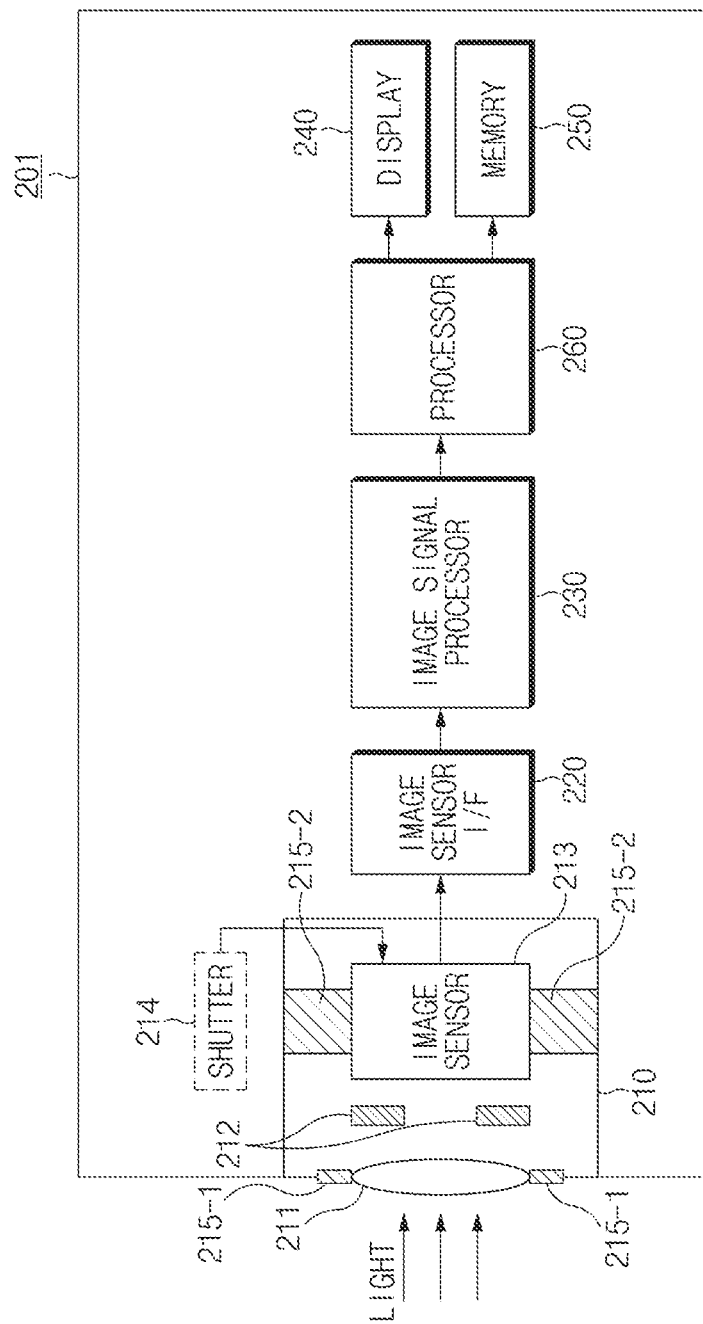
FIG. 2 illustrates a block diagram of an electronic device according to an embodiment.

FIG. 2 illustrates a block diagram of an electronic device according to an embodiment.

Referring to FIG. 2, an electronic device 201 according to an embodiment may include a camera module 210, an image sensor interface (I/F) 220, an image signal processor (ISP) 330, a display 240, a memory 250, and a processor 260. The electronic device 201 shown in FIG. 2 may correspond to an electronic device shown in FIG. 1, and a duplicated description of the corresponding configuration may be omitted. According to various embodiments, the electronic device 201 may be implemented by omitting some components or may be implemented by further including a component which is not shown.

The camera module 210 (e.g., a camera module 180) may include a lens 211, an aperture 212, an image sensor 213, a shutter 214, and optical image stabilization (OIS) driving modules 215-1 and 215-2. According to various embodiments, the camera module 210 may be implemented by omitting some components or may be implemented by further including a component which is not shown.

The lens 211 may condense light incident from the outside to the camera module 210. The condensed light may arrive at the image sensor 213 through the aperture 212. In other words, the lens 211 may allow light reflected from a subject or light generated from the subject to arrive at a pixel array of the image sensor 213.

The aperture 212 may adjust, for example, an amount of light which arrives at (or is incident to) the image sensor 213, under control of the processor 260. In general, the larger the aperture value, the more the amount of light arriving at the image sensor 213 may decrease. The smaller the aperture value, the more the amount of light arriving at the image sensor 213 may increase.

The image sensor 213 may include a pixel array where a plurality of unit pixels are in a grid shape in two dimensions. Millions to tens of millions of unit pixels may be included in the pixel array, and one of a plurality of reference colors may be assigned to each of the pixels. For example, the plurality of reference colors may include "red, green, blue (RGB)" or "red, green, blue, white (RGBW)". The image sensor 213 may be implemented using, for example, a charge-coupled device (CCD) or a complementary metal-oxide-semiconductor (CMOS).

According to an embodiment, the image sensor 213 may generate an electrical signal in response to light incident from the outside. Digital image data may be generated based on the electrical signal.

The shutter 214 may adjust a time when the image sensor 213 is exposed to light. For example, more light may be incident to the image sensor 213 when the shutter 214 operates slowly, and less light may be incident to the image sensor 213 when the shutter 214 operates quickly. The time when the shutter 214 operates may be adjusted based on a shutter speed. The shutter 214 may include a mechanical shutter or an electronic shutter in such a manner as to control an image sensor.

The OIS driving modules 215-1 and 215-2 may dynamically adjust arrangement or position of the lens 213 or the image sensor 213. In general, the OIS driving modules 215-1 and 215-2 may minutely adjust arrangement or position of the lens 211 or the image sensor 213 in a direction opposite to a direction of trembling of a hand holding the electronic device 201. As a result, motion of an image, which is capable of being generated by the trembling of the hand, may be corrected. According to various embodiments, the OIS driving modules 215-1 and 215-2 may be referred to as a vibration reduction (VR) module, an image stabilizer (IS), an optical stabilizer (OS), an anti-shake (AS) module, a steady shot module, or the like, depending on a manufacturer of the electronic device 201.

The image sensor interface (I/F) 220 may serve as a medium for transmitting and receiving data between the image sensor 213 and another component (e.g., the image signal processor 230). For example, image data generated by the image sensor 213 may be delivered to the image signal processor 230.

The image signal processor 230 may include a plurality of image processing blocks (hereinafter referred to as IP blocks). The image signal processor 230 may correct an image from the camera module 210 by means of the plurality of IP blocks. For example, the IP block may include various IP blocks, for example, an IP block for color interpolation, an IP block for lens shading correction, an IP block for auto white balance, an IP block for lateral chromatic aberration correction, an IP block for optical inverse correction, an IP block for noise reduction, an IP block for edge enhancement, an IP block for gamma correction, or an IP block for out of focusing. The plurality of IP blocks may be referred to as an image processing filter, an image processing module, or the like. Furthermore, according to various embodiments, the image signal processor 230 may be included in the processor 260.

The display 240 (e.g., a display device 160) may include, for example, an LCD, an LED display, an OLED display, a MEMS display, or an electronic paper display. The display 240 may display an image or the like, which is captured by the camera module 210 and is corrected by the image signal processor 230.

The memory 250 (e.g., a memory 130) may include a volatile and/or non-volatile memory. The memory 250 may store, for example, a command or data associated with at least one other component of the electronic device 201. For example, the memory 250 may store an image data file as a final result processed by the image signal processor 230.

According to an embodiment, the memory 250 may store data about correlationship between a value of at least one first parameter and a value of a second parameter. The value of the first parameter and the value of the second parameter may be obtained through calculation using a value (e.g., a pixel value) of electrical signals output from two or more light receiving elements included in a unit element of the image sensor 213. The first parameter may be calculated based on reference color components indicating a color of an image. For example, the value of the first parameter may be a value obtained by dividing a B value by a G value and a value obtained by dividing an R value by the G value, based on the R, G, and B values which are the reference components indicating the color the image. The second parameter may be calculated based on a first pixel value output from a first light receiving element of pixels forming the color of the image and a second pixel value output from a second light receiving element of the pixels. For example, the value of the second parameter may be a value obtained by dividing the first pixel value by the second pixel value.

According to an embodiment, one pixel may include one of a red filter, a green filter, and a blue filter. According to an embodiment, three values of the second parameter may be calculated. The three values of the second parameter may include a value calculated based on a first pixel value and a second pixel value of a pixel including the red filter, a value calculated based on a first pixel value and a second pixel value of a pixel including the green filter, and a value calculated based on a first pixel value and a second pixel value of a pixel including the blue filter.

According to an embodiment, the value of the second parameter may be calculated based on a chrominance signal y value. The value of the second parameter calculated based on the chrominance signal y value may be a value Obtained by dividing (0.3×the first pixel value of the pixel including the red filter+0.59×the first pixel value of the pixel including the green filter+0.11×the first pixel value of the pixel including the blue filter) by (0.3×the second pixel value of the pixel including the red filter+0.59×the second pixel value of the pixel including the green filter+0.11×the second pixel value of the pixel including the blue filter).

According to an embodiment when there are two first parameters, the data about the correlationship may be three-dimensional lookup table data in which the two first parameters and the second parameter correlate with each other.

According to an embodiment, the data about the correlationship may be generated based on values of at least one first parameter and values of a second parameter, which are obtained by capturing a plurality of color charts having different colors. According to an embodiment, the data about the correlationship may be data generated according to at least one of regression analysis, machine learning, or a pattern recognition method using the obtained values of the at least one first parameter and the obtained values of the second parameter.

The data about the correlationship may correspond to each of a plurality of segmented regions of an image obtained through the image sensor and a type of a predefined light source. For example, the data about the correlationship may be data corresponding to a third region of the image and a 7200K light source.

According to an embodiment, the memory 250 may store data for correcting white balance of an image corresponding to a type of a light source.

The processor 260 (e.g., the processor 120) may be electrically connected with the components 210 to 350 included in the electronic device 201 and may execute calculation or data processing about control and/or communication of the components 210 to 350 included in the electronic device 201.

According to an embodiment, the processor 260 may obtain pixel values respectively from two or more light receiving elements included in a unit pixel of the image sensor 213 and may determine a type of a light source of an image based on the pixel values.

According to an embodiment, the processor 260 may calculate at least one parameter using the pixel values from the two or more light receiving elements included in the unit pixel. The processor 260 may determine a type of a light source of an image based on the at least one parameter. For example, the processor 260 may determine the type of the light source of the image with reference to data about correlationship, which is stored in the memory 250.

According to an embodiment, the processor 260 may apply white balance correction corresponding to the determined type of the light source to at least a portion of a captured image.

The described operation of the processor 260 may be an example, which is not limited to the above-mentioned description. For example, an operation of the processor, which is described in another portion of the disclosure below, may be understood as the operation of the processor 260. Furthermore, in the disclosure, at least some of operations described as operations of the "electronic device" may be understood as the operations of the processor 260.

Figure 3:
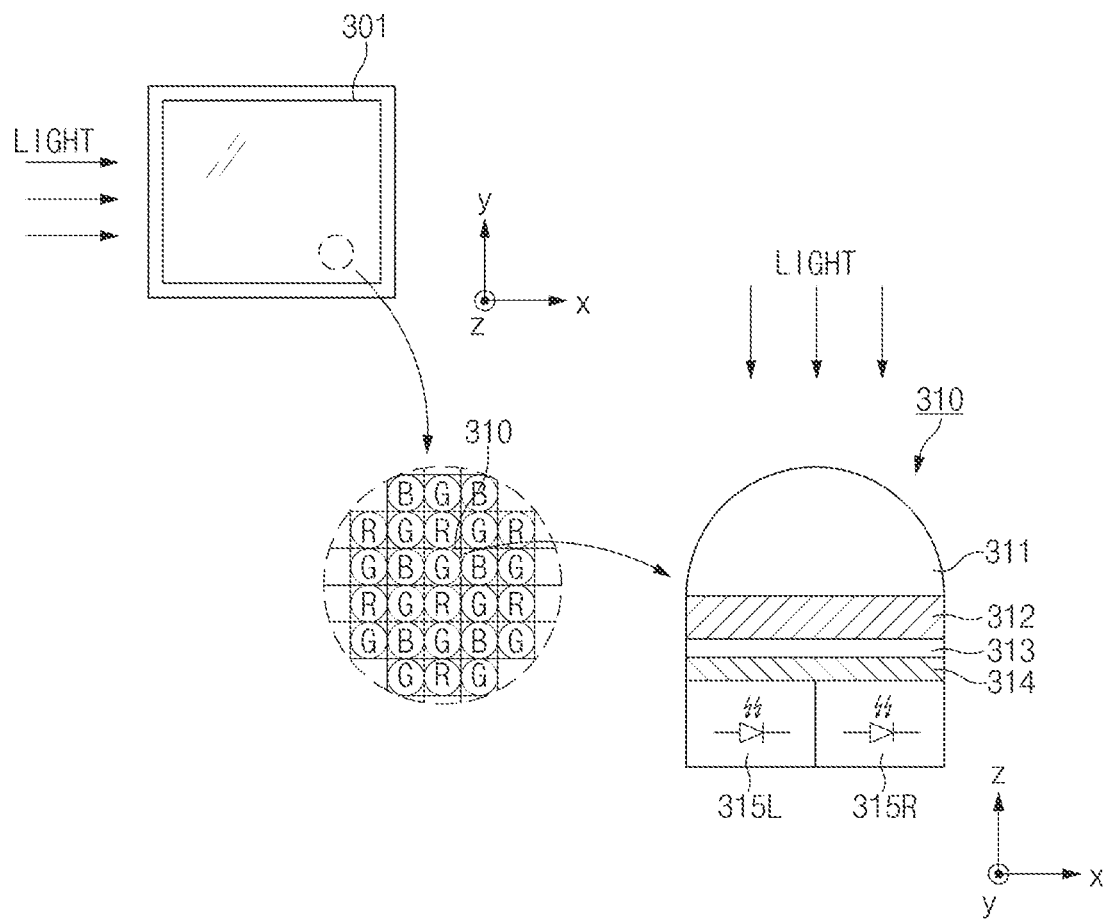
FIG. 3 illustrates a configuration of an image sensor according to an embodiment.

FIG. 3 illustrates a configuration of an image sensor according to an embodiment.

Referring to FIG. 3, an image sensor 301 may include a plurality (millions to tens of millions) of (unit) pixels. In the plurality of pixels, for example, hundreds-thousands of pixels may be arranged or positioned in an x-axis direction (a horizontal direction) and hundreds-thousands of pixels may be arranged or positioned in a y-axis direction (a vertical direction). For example, the image sensor 301 may correspond to an image sensor 313 shown in FIG. 3.

According to an embodiment, a specified reference color (red (R), green (G), or blue (B)) may be assigned to each of a plurality of pixels included in the image sensor 301. The plurality of pixels may be designed to receive light having a specified wavelength range in light incident in a z-axis direction. At each of the plurality of pixels, an electrical signal may be output in response to the received light.

According to an embodiment, a unit pixel 310 may include a microlens 311, various films or filters 312 to 314, a first light receiving element 315L, and a second light receiving element 315R. According to various embodiments, the unit pixel 310 may additionally include other configurations, such as a conductor pattern or a high refractive pattern, which electrically connect the light receiving elements 315L and 315R with an image processor. Furthermore, it is shown that the unit pixel 310 of FIG. 3 includes only the two light receiving elements 315L and 315R. However, three or more light receiving elements may be included in the unit pixel 310.

The microlens 311 may condense incident light such that the incident light arrives at the first light receiving element 315L and the second light receiving element 315R. The incident light may be refracted by the microlens 311 to form a condensing spot (referred to as an optical spot) on the first light receiving element 315L and the second light receiving element 315R.

The infra-red cut filter 312 may block an infrared ray of at least a portion of light incident through the microlens 311. For example, the infra-red cut filter 312 may prevent overexposure from being generated in the daytime when there is a sufficient light source. Meanwhile, the infra-red cut filter 312 may be excluded in the night.

The color filter 313 may be arranged or positioned under the microlens to pass light having a specified reference color, that is, light having a specified wavelength range. For example, the color filter 313 may correspond to one of a red filter, a green filter, and a blue filter. A Bayer pattern of the image sensor 301 may be implemented by the color filter 313.

The antireflection film 314 may prevent light incident through the microlens 311 from being reflected to increase an amount of light which arrives at the first light receiving element 315L and the second light receiving element 315R.

The first light receiving element 315L and the second light receiving element 315R may correspond to, for example, photo diodes formed on a semiconductor substrate. The first light receiving element 315L and the second light receiving element 315R may output electrical signals, respectively, in response to an incident light, by the photoelectric effect. For example, the first light receiving element 315L and the second light receiving element 315R may generate a charge (or current) according to intensity of received light (or an amount of the light). An output value may be determined based on an amount (or current) of the charge. According to various embodiments, the light receiving elements 315L and 315R may be referred to as "imaging elements".

Furthermore, it is shown that the two light receiving elements 315L and 315R are arranged or positioned on one unit pixel in FIG. 3, but not limited thereto. According to various embodiments, one light receiving element or three or more light receiving elements may be arranged or positioned. In this case, a pixel on which two or more light receiving elements are arranged or positioned may be referred to as "multi-pixel", and a pixel on which two light receiving elements are arranged or positioned may be referred to as "dual pixel".

Figure 4:
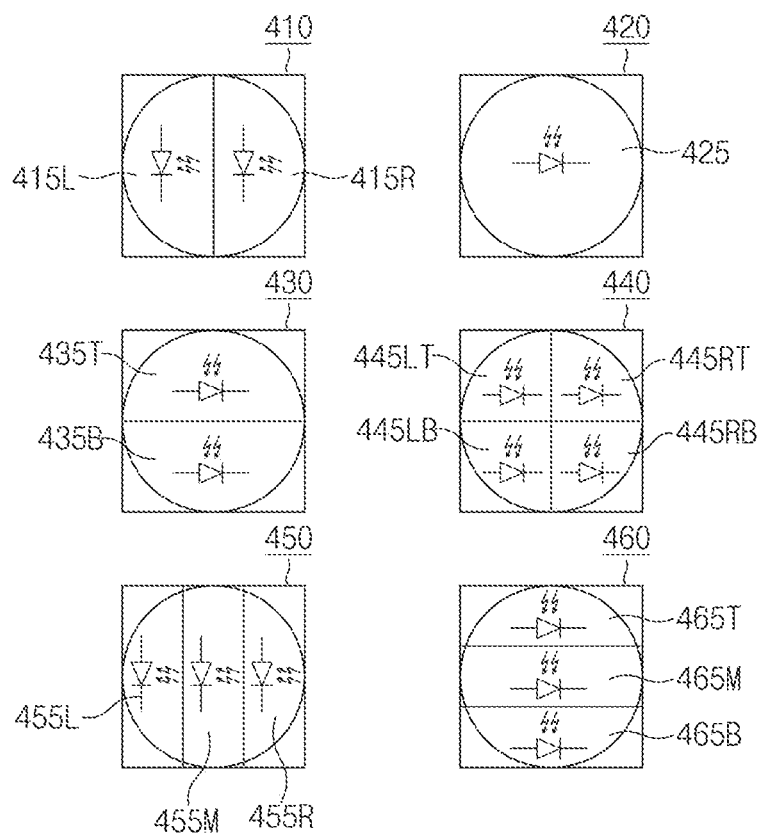
FIG. 4 illustrates a layout of a light receiving element according to various embodiments.

FIG. 4 illustrates a layout of a light receiving element according to various embodiments.

Referring to FIG. 4, unit image sensors 410 to 460 on which light receiving elements according to various embodiments are arranged or positioned are shown. A plurality of various types of unit image sensors 410 to 460 shown in FIG. 4 may be included in, for example, a pixel array of an image sensor 213 of FIG. 2. The arrangement or position of the light receiving elements according to various embodiments shown in FIG. 4 may be an example, which is not limited to the shown example.

According to an embodiment, a first light receiving element 415L and a second light receiving element 415R, which are arranged or positioned horizontally, may be included in the one pixel 410 (or the one unit image sensor). The light receiving elements 415L and 415R, which are arranged or positioned horizontally, may receive light having different phases in a horizontal direction and may generate a first image and a second image about the same subject.

According to another embodiment, a first light receiving element 435T and a second light receiving element 435B, which are arranged or positioned vertically, may be included in the one pixel 430. The light receiving elements 435T and 435B, which are arranged or positioned vertically, may receive light having different phases in a vertical direction and may generate a first image and a second image about the same subject.

According to another embodiment, a first light receiving element 445LT arranged and positioned at a left top end, a second light receiving element 445RT arranged or positioned at a right top end, a third light receiving element 445LB arranged or positioned at a left bottom end, and a fourth light receiving element 445RB arranged or positioned at a right bottom end may be included in the one pixel 440. The four light receiving elements 445LT, 445RT, 445LB, and 445RB may generate a first image, a second image, a third image, and a fourth image about the same subject, which have different phase differences, respectively.

According to another embodiment, a first light receiving element 455L arranged and positioned at a left side in a horizontal direction, a second light receiving element 455M arranged and positioned in the center, and a third light receiving element 455R arranged or positioned at a right side may be included in the one pixel 450. The three light receiving elements, 455L, 455M, and 455R may generate a first image, a second image, and a third image about the same subject, which have different phase differences, respectively.

According to another embodiment, a first light receiving element 465T arranged and positioned at a top side in a vertical direction, a second light receiving element 465M arranged or positioned in the center, and a third light receiving element 455B arranged or positioned at a bottom side may be included in the one pixel 460. The three light receiving elements, 465T, 465M, and 465B may generate a first image, a second image, and a third image about the same subject, which have different phase differences, respectively.

Prior to describing an operation according to an embodiment, data about correlationship, which is stored in a memory, is described with reference to FIGS. 5A to 6C.

Graphs and data shown in FIGS. 5A to 6C may be graphs and data based on a pixel value obtained by capturing a color chart, which a light source, a color temperature of which is 7200 k, a light source, a color temperature of which is 6700 k, and a light source, a color temperature of which is 6500 k, are supplied to the color chart on which a predetermined single color is printed.

Figure 5A:
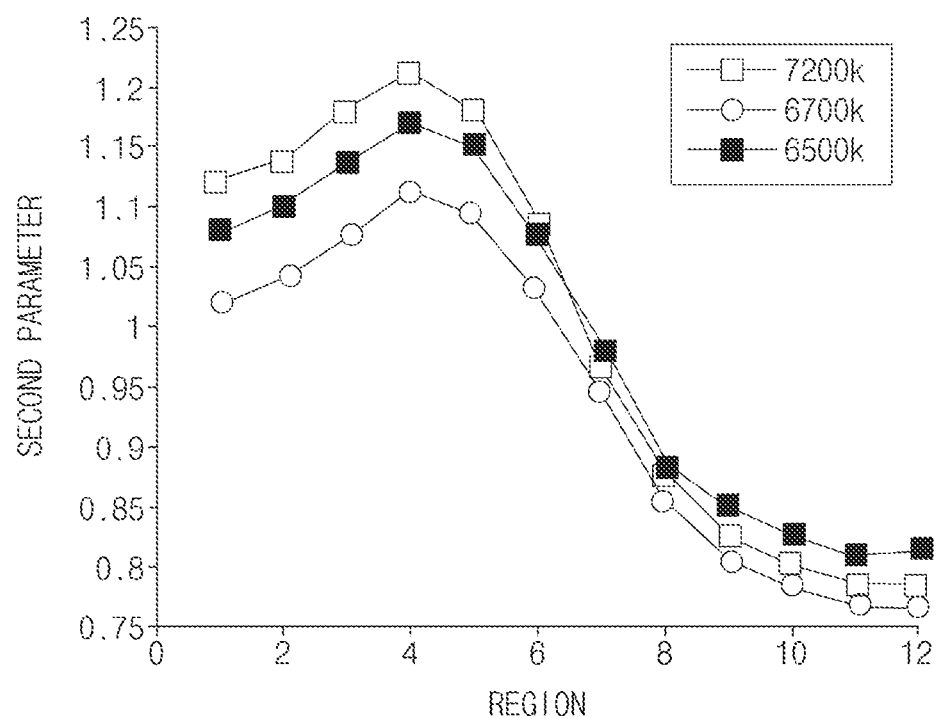
FIGS. 5A to 5C are graphs illustrating a value of a second parameter according to a region of an image for each type of a light source according to an embodiment.
Figure 5B:
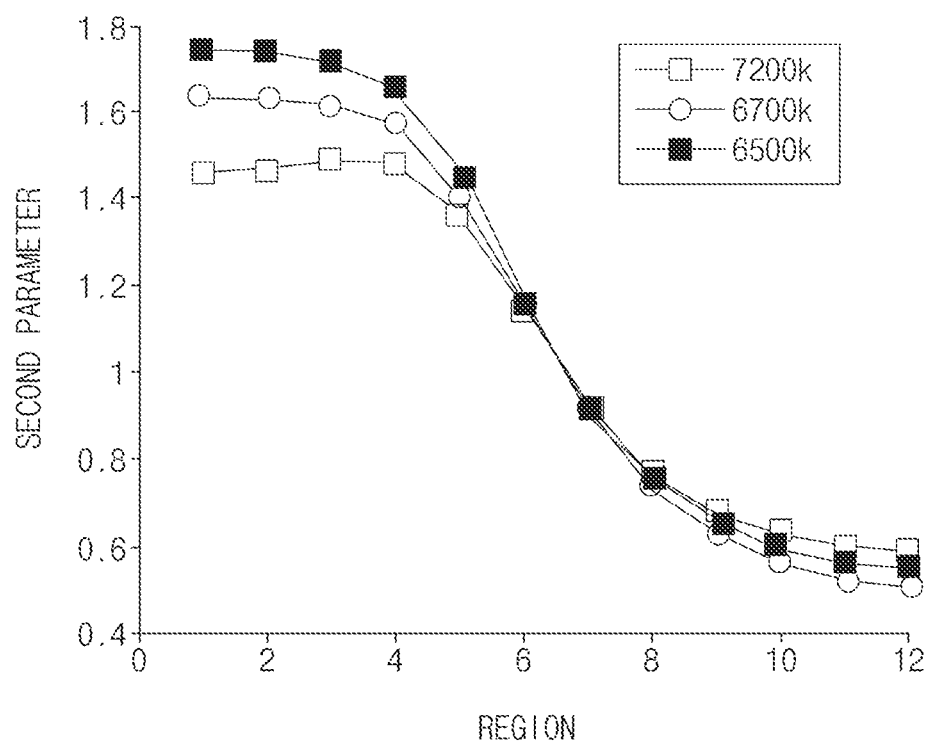
Figure 5C:
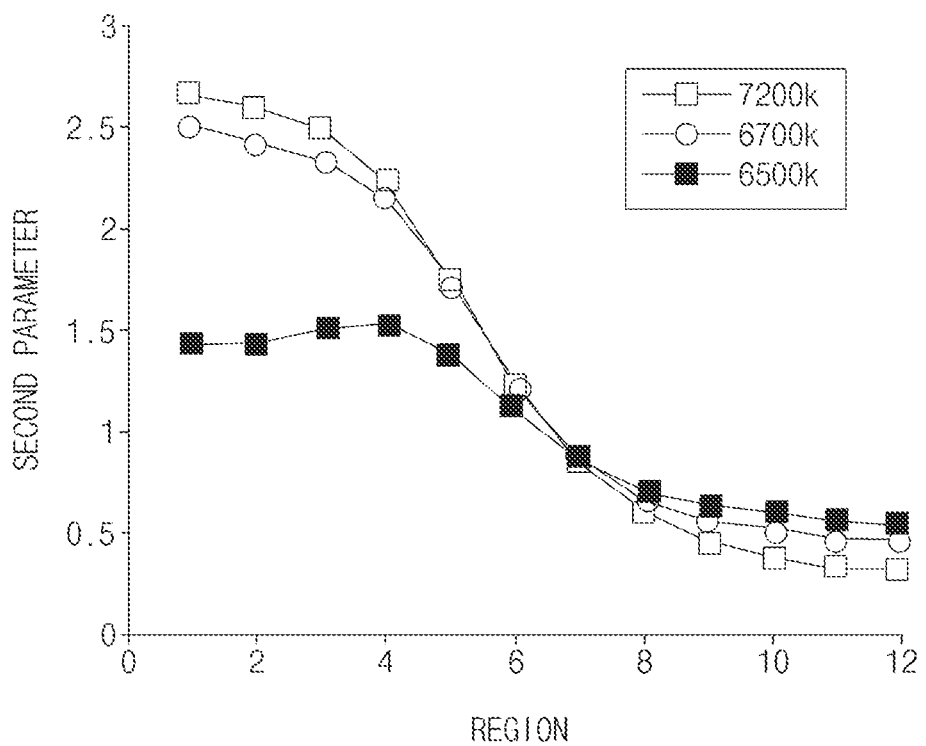

FIGS. 5A to 5C are graphs illustrating a value of a second parameter according to a region of an image for each type of a light source according to an embodiment.

FIG. 5A is a graph illustrating a value of a second parameter calculated based on a first pixel value and a second pixel value of a pixel including a red filter. FIG. 5B is a graph illustrating a value of a second parameter calculated based on a first pixel value and a second pixel value of a pixel including a green filter. FIG. 5C is a graph illustrating a value of a second parameter calculated based on a first pixel value and a second pixel value of a pixel including a blue filter.

An x-axis value on the graphs of FIGS. 5A to 5C may correspond to segmented regions of an image obtained by capturing a color chart. An value of the second parameter, which is a y-axis value, may be a value calculated based on a first pixel value and a second pixel value of a pixel including a green filter forming a color of each region of the obtained image, a value calculated based on a first pixel value and a second pixel value of a pixel including a red filter forming a color of each region, and a value calculated based on a first pixel value and a second pixel value of a pixel including a blue filter forming a color of each region. For example, a value of the second parameter, which corresponds to region 2 of the graph shown in FIG. 5A, may be a value obtained by dividing "the sum (or average) of first pixel values of pixels including a red filter forming a color of region 2 of the obtained image" by "the sum (or average) of second pixel values of pixels including a red filter forming a color of region 2 of the obtained image".

Referring to FIGS. 5A to 5C, although a single color chart is captured in the same light source condition, values of the second parameter may differ from each other for each region of the image. Furthermore, although the same color chart is captured, when a light source condition differs, values of the second parameter of the same region may differ from each other.

Meanwhile, the first parameter may be a parameter based on reference color components indicating a representative color of each of segmented regions of the obtained image. For example, a representative color of one region may be determined according to an average value of pixel values in the region, and the first parameter may be a parameter based on component R, component G, and component B of the representative color. According to an embodiment, the first parameter may be two in number, and the values of the first parameter may be a value obtained by dividing an R value indicating the representative color by a G value indicating the representative color and a value obtained by dividing a B value indicating the representative color by the G value indicating the representative color.

Because the at least one first parameter and the second parameter are based on a pixel value corresponding to one region, a value of the at least one first parameter may correspond to a value of the second parameter. Data about correlationship between the value of the at least one first parameter and the value of the second parameter is shown in FIGS. 6A to 6C.

Figure 6A:
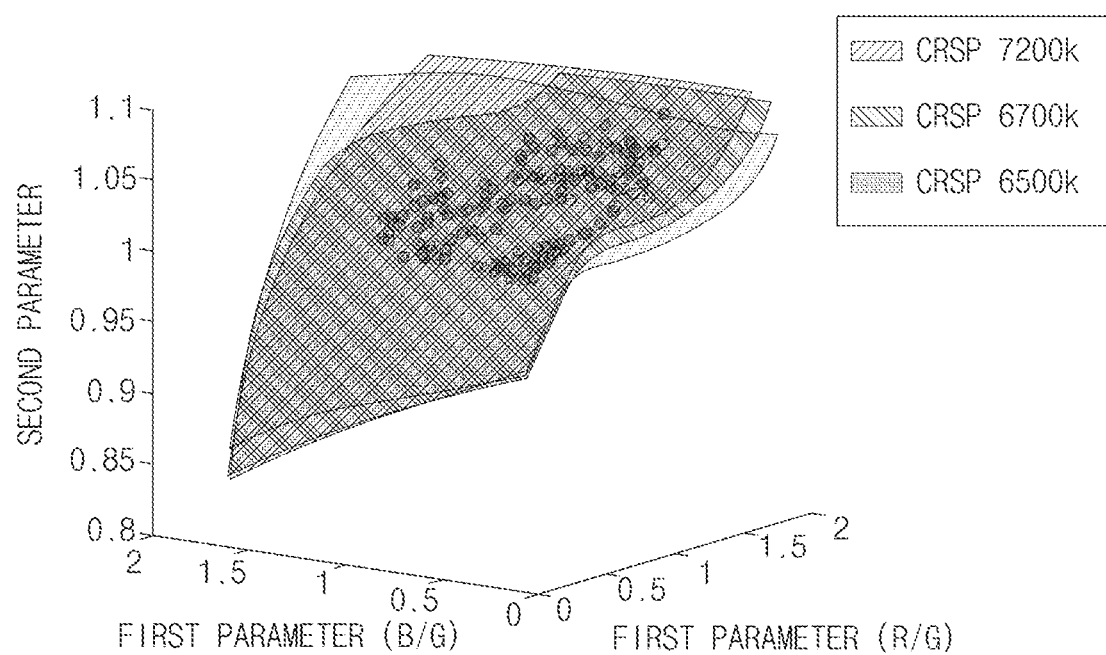
FIGS. 6A to 6C are drawings illustrating data about correlationship between a first parameter and a second parameter for each type of a light source on a three-dimensional coordinate system according to an embodiment.
Figure 6B:
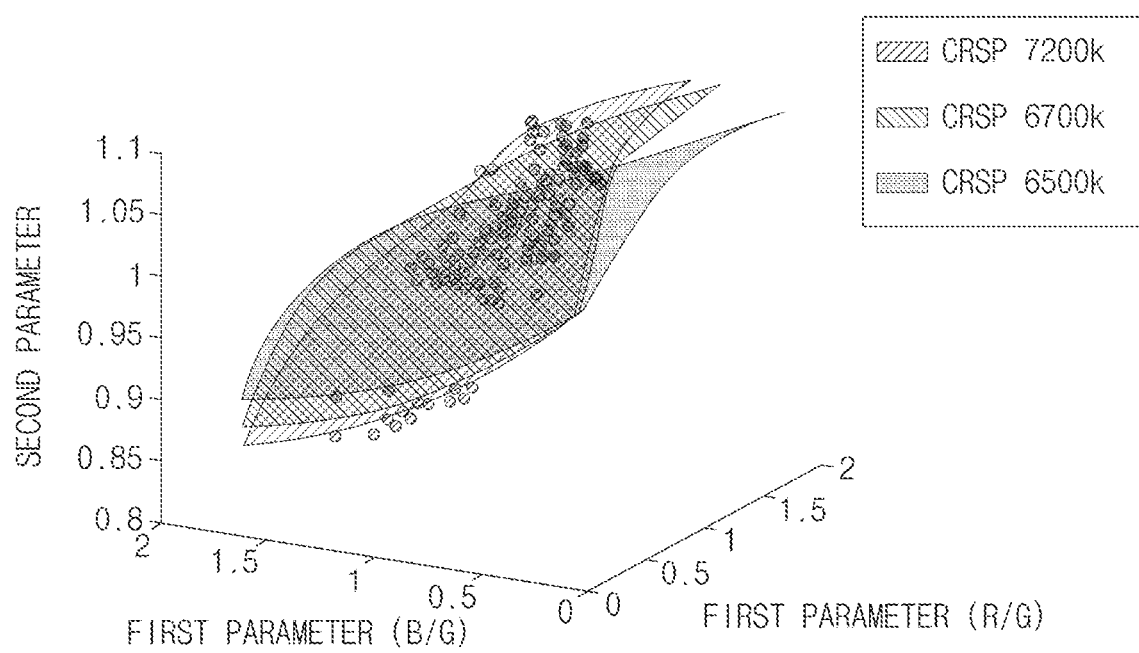
Figure 6C:
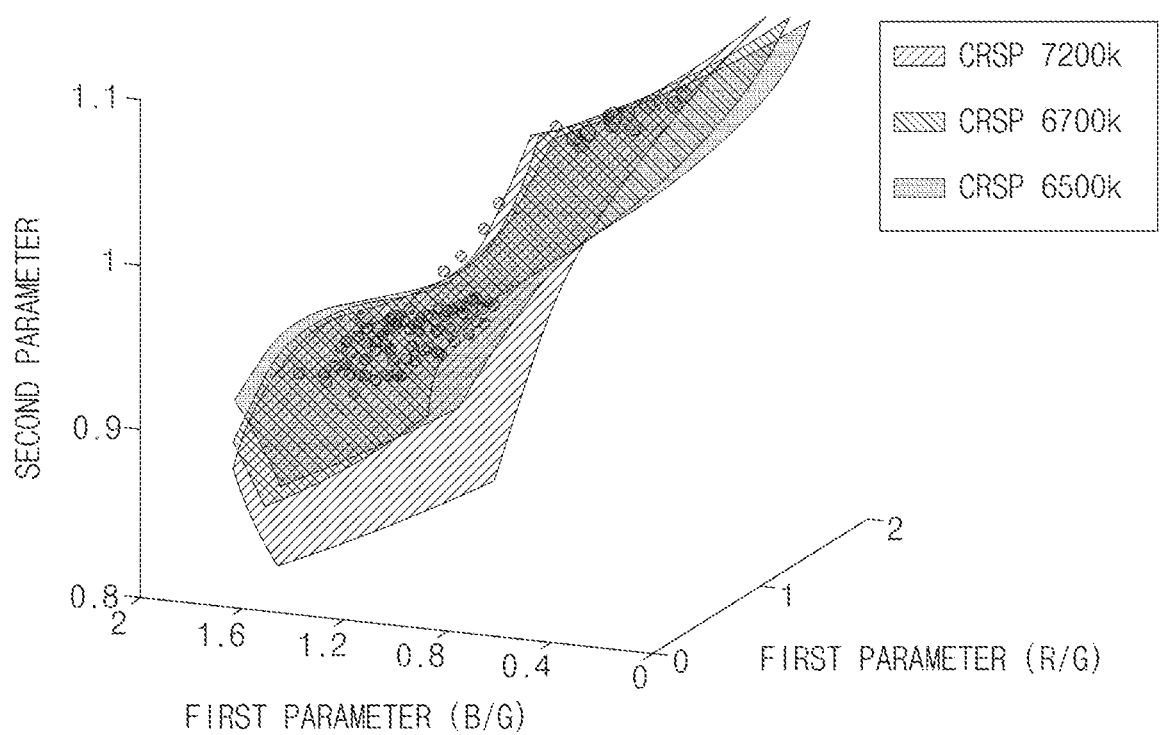

FIGS. 6A to 6C are drawings illustrating data about correlationship between a first parameter and a second parameter for each type of a light source on a three-dimensional coordinate system according to an embodiment.

FIG. 6A illustrates data about correlationship between two first parameters and a value of a second parameter calculated based on a first pixel value and a second pixel value of a pixel including a red filter. FIG. 6B illustrates data about correlationship between two first parameters and a value of a second parameter calculated based on a first pixel value and a second pixel value of a pixel including a green filter. FIG. 6C illustrates data about correlationship between two first parameters and a value of a second parameter calculated based on a first pixel value and a second pixel value of a pixel including a blue filter.

A value of the first parameter, which is an x-axis value on a coordinate system of FIGS. 6A to 6C, may be a value obtained by dividing an R value indicating a representative color of each region by a G value indicating the representative color, and a value of the first parameter, which is a y-axis value, may be a value obtained by dividing a B value indicating a representative color of each region by the G value indicating the representative color. A value of the second parameter, which is a y-axis value, may be a value calculated based on a first pixel value and a second pixel value of a pixel including a green filter forming a color of each region, a value calculated based on a first pixel value and a second pixel value of a pixel including a red filter forming a color of each region, and a value calculated based on a first pixel value and a second pixel value of a pixel including a blue filter forming a color of each region.

Referring to FIGS. 6A to 6C, points on a three-dimensional coordinate system may be values of the first parameter and values of the second parameter, which are calculated based on a pixel value obtained by capturing a color chart. According to an embodiment, a surface which is data about correlationship between the first parameter and the second parameter shown in FIGS. 6A to 6C may show three-dimensional lookup table data in which the two first parameters and the second parameter correlate with each other. The surface or the three-dimensional lookup table data may be generated according to at least one of regression analysis, machine learning, or a pattern recognition method using the calculated values of the at least one first parameter and the calculated values of the second parameter.

Data about correlationship between a value of the at least one first parameter and a value of the second parameter may be derived by the above-mentioned method. The data about the correlationship may correspond to each of a plurality of segmented regions of an image obtained through the image sensor and a type of a predefined light source.

Figure 7:
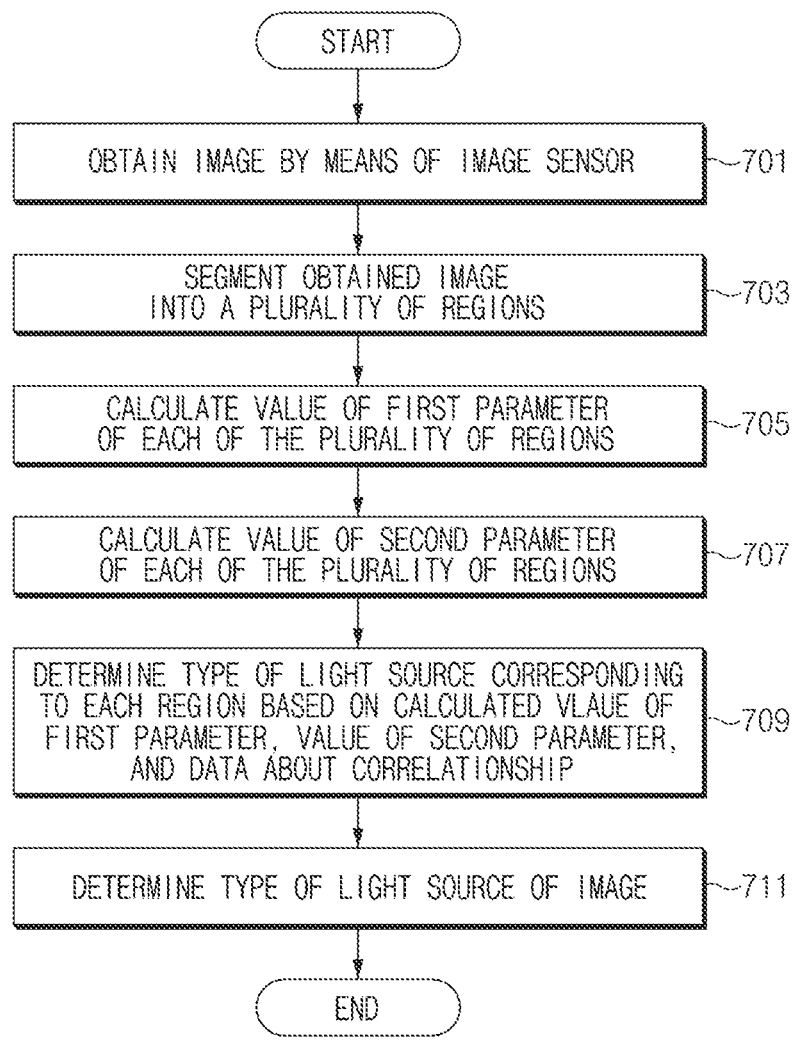
FIG. 7 is a flowchart illustrating a method for determining a type of a light source of an image according to an embodiment.

FIG. 7 is a flowchart illustrating a method for determining a type of a light source of an image according to an embodiment.

Hereinafter, it is assumed that an electronic device of FIG. 2 performs a process of FIG. 7. An operation described as being performed by the electronic device may be implemented as instructions (commands) capable of being performed (or executed) by a processor 260 of the electronic device. The instructions may be stored in, for example, a computer storage medium or a memory of the electronic device shown in FIG. 2.

In operation 701, the processor 260 may obtain an image by means of an image sensor.

In operation 703, the processor 260 may segment the obtained image into a plurality of regions.

For example, the processor 260 may segment the obtained image into regions, each of which has the same size.

According to an embodiment, the processor 260 may bin pixels included in each of the plurality of segmented regions. For example, the processor 260 may set an average of pixel values included in each region to a representative pixel value of each region. According to an embodiment, a color according to the set representative pixel value may be set to a representative color of each of the plurality of regions.

In operation 705, the processor 260 may calculate values of at least one first parameter for every the plurality of regions based on reference color components indicating a representative color of each of the plurality of regions.

According to an embodiment, the reference color components may be R, G, and B values, and the values of the at least one first parameter may be a value obtained by dividing the B value by the G value and a value obtained by dividing the R value by the G value. According to an embodiment, each of the plurality of regions may have a value of the two first parameters.

In operation 707, the processor 260 may calculate values of the second parameter for every the plurality of regions based on first pixel values output from a plurality of first light receiving elements included in each of the plurality of regions and second pixel values output from a plurality of second light receiving elements.

According to an embodiment, the value of the second parameter of each of the plurality of regions may be a value obtained by dividing an average value of the first pixel values output from the first light receiving elements included in each of the plurality of regions by an average value of the second pixel values output from the second light receiving elements.

According to an embodiment, the average value of the first pixel values output from the first light receiving elements included in each of the plurality of regions may be a value output from first light receiving elements forming a representative pixel value of the binned pixels. The average value of the second pixel values output from the second light receiving elements included in each of the plurality of regions may be a value output from second light receiving elements forming a representative pixel value of the binned pixels.

According to an embodiment, one pixel may include one of a red filter, a green filter, and a blue filter. According to an embodiment, the processor 260 may calculate three second parameter values corresponding to one region. For example, the processor 260 may calculate a value of the second parameter based on a first pixel value and a second pixel value of a pixel including the red filter, a value of the second parameter based on a first pixel value and a second pixel value of a pixel including the green filter, and a value of the second parameter based on a first pixel value and a second pixel value of a pixel including the blue filter.

According to an embodiment, the processor 260 may calculate a value of the second parameter based on a chrominance signal y value. The value of the second parameter calculated based on the chrominance signal y value may be a value obtained by dividing (0.3×the first pixel value of the pixel including the red filter+0.59×the first pixel value of the pixel including the green filter+0.11×the first pixel value of the pixel including the blue filter) by (0.3×the second pixel value of the pixel including the red filter+0.59×the second pixel value of the pixel including the green filter+ 0.11×the second pixel value of the pixel including the blue filter).

In operation 709, the processor 260 may determine a type of a light source corresponding to each of the plurality of regions based on values of the second parameter included in data about correlationship, which correspond to each region and a value of the first parameter calculated for each region, and a value of the second parameter calculated for each region.

According to an embodiment, the processor 260 may determine a type of a predefined light source, which corresponds to data about correlationship having a value of the second parameter, which is closest to a value of the second parameter calculated for each region, among data about correlationship corresponding to each region and a value of the first parameter calculated for each region as a type of a light source of each region.

For example, when values of the first parameter calculated from region 2 are 0.3 and 0.5 and when a value of the second parameter is 1.5, the processor 260 may select data about correlationship having a value of the second parameter, which is closest to 1.5, among the values of the second parameters of data about correlationship corresponding to region 2. The processor 260 may determine a type of a light source corresponding to the selected data about the correlationship as a type of a light source of region 2.

In operation 711, the processor 260 may determine a type of a light source of the image based on the determined types of the light source corresponding to each of the regions.

According to an embodiment, the processor 260 may determine a type of a light source, which occupies the highest percentage, among the types of the light source corresponding to each of the plurality of regions, which are determined in operation 709, as the type of the light source of the image.

According to an embodiment, a weight may be assigned to a type of a light source corresponding to at least one predetermined region among the plurality of regions, and the type of the light source of the image may be determined based on the type of the light source to which the weight is assigned and a type of a light source to which the weight is not assigned. In an embodiment, the image may be segmented into 12 regions, a type of a light source corresponding to regions 1 to 6 may be a first type, and a type of the light source corresponding to regions 7 to 12 may be a second type. In an embodiment, when a weight is assigned to regions 1 to 4, although the number of regions corresponding to the first type and the number of regions corresponding to the second type are the same as each other, the processor 260 may determine a type of a light source of an image as the first type.

After operation 711, white balance of the image may be corrected based on the determined type of the light source of the image.

According to an embodiment, the processor 260 may correct the white balance of the image with reference to data for correcting the white balance of the image corresponding to a type of a light source, which is stored in the memory.

Hereinafter, an embodiment of determining a light source of an image depending on the method described above will be described with reference to FIGS. 8A to 10.

Figure 8A:
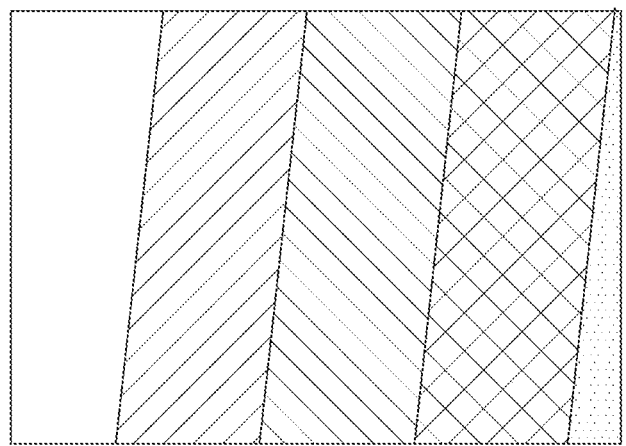
FIG. 8A is an image obtained by an image sensor according to an embodiment.
Figure 8B:
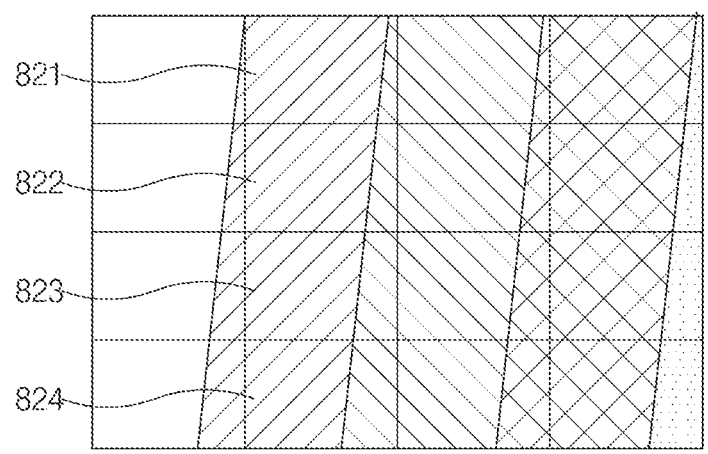
FIG. 8B is a drawing illustrating that an obtained image is segmented into a plurality of regions according to an embodiment.
Figure 8C:
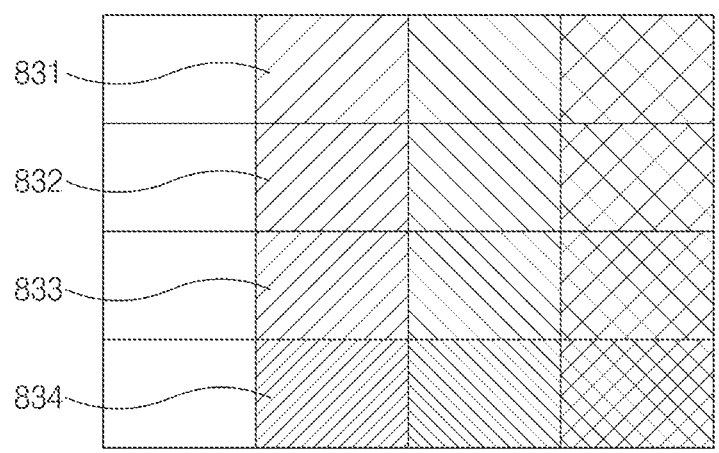
FIG. 8C is a drawing illustrating that an obtained image is binned for each region according to an embodiment.

FIG. 8A is an image obtained by an image sensor according to an embodiment. FIG. 8B is a drawing illustrating that an obtained image is segmented into a plurality of regions according to an embodiment. FIG. 8C is a drawing illustrating that an obtained image is binned for each region according to an embodiment.

Figure 9A:
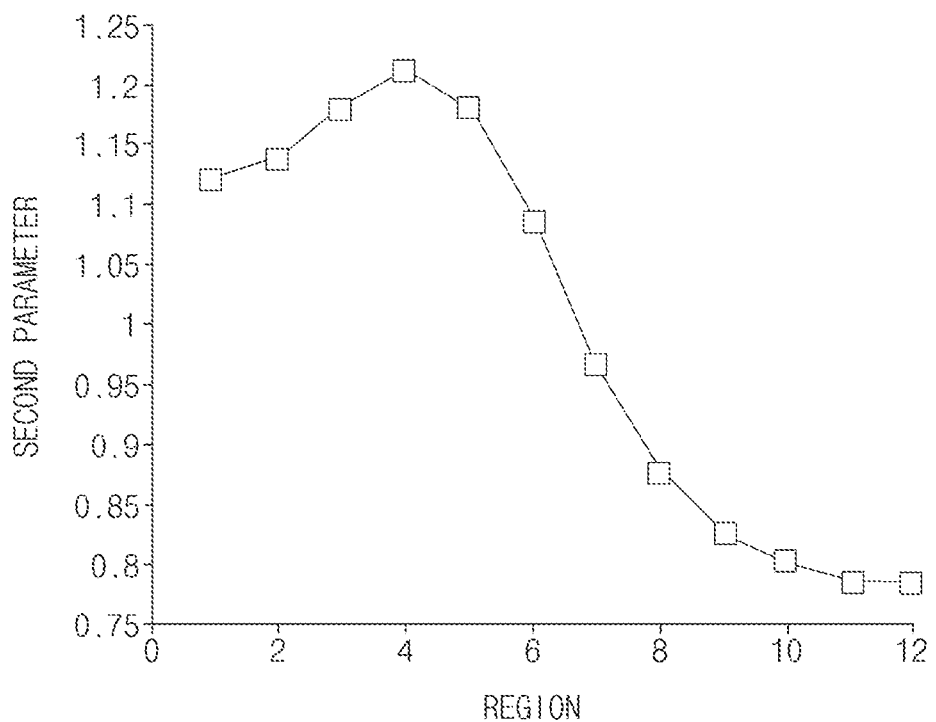
FIGS. 9A to 9C are graphs illustrating a value of a second parameter according to a region of an image according to an embodiment.
Figure 9B:
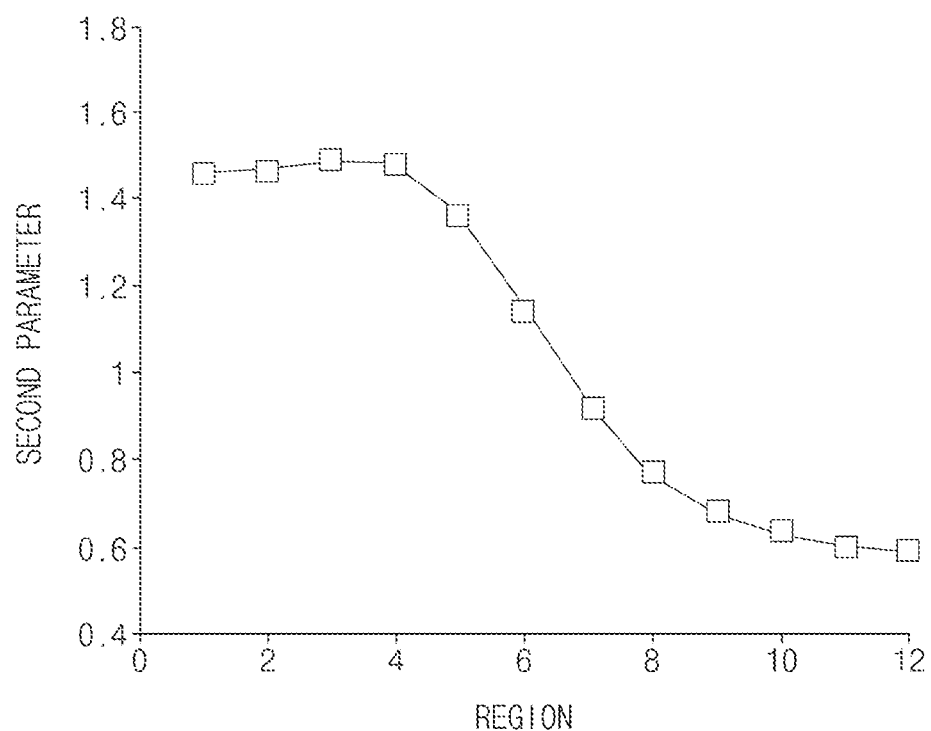
Figure 9C:
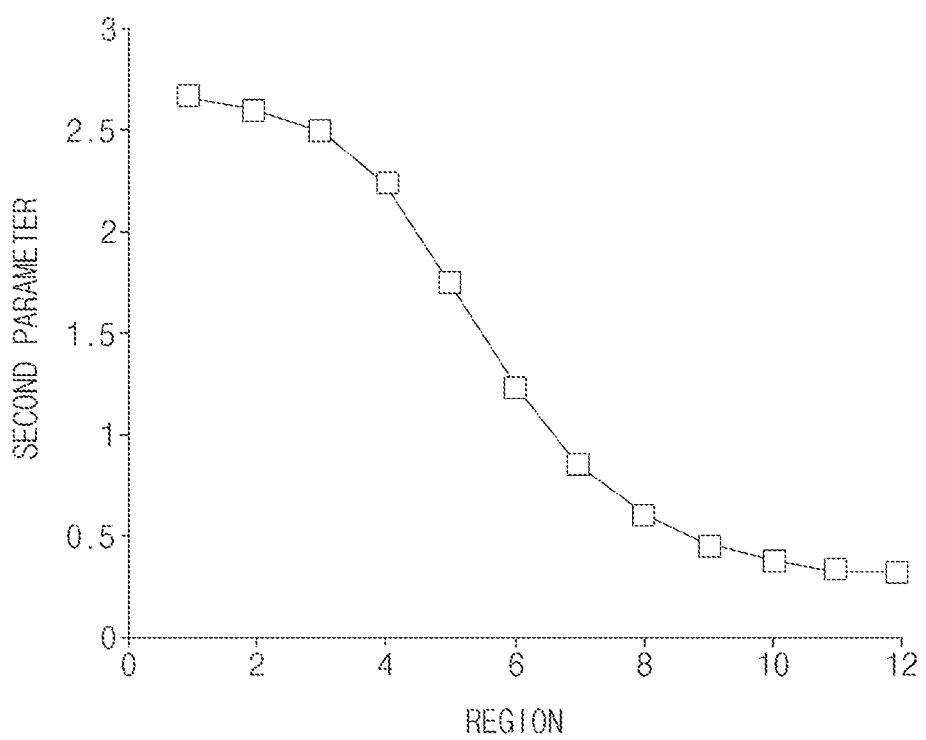

FIGS. 9A to 9C are graphs illustrating a value of a second parameter according to a region of an image according to an embodiment.

Figure 10:
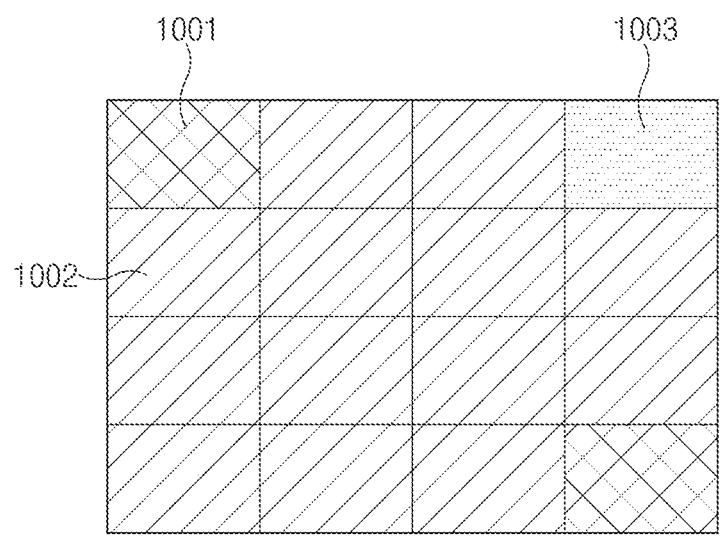
FIG. 10 is a drawing illustrating a type of a light source determined for every a plurality of regions of an image according to an embodiment.

FIG. 10 is a drawing illustrating a type of a light source determined for every a plurality of regions of an image according to an embodiment.

According to an embodiment, a processor 260 may obtain an image shown in FIG. 8A by means of an image sensor (operation 701). The processor 260 may segment the obtained image into a plurality of regions as shown in FIG. 8B (operation 703).

According to an embodiment, the processor 260 may bin pixels included in each of the plurality of segmented regions. The processor 260 may obtain an image shown in FIG. 8C by binning the respective regions. Each region of the obtained binned image may have one representative color.

Referring to FIG. 8B, each of four regions 821, 822, 823, and 824 may include two colors, but each region may include two colors at different rates. The four regions 831, 832, 833, and 834 may have similar colors by pixel binning as shown in FIG. 8C, but, because two colors of different rates are binned, values of the colors of the respective regions may differ from each other.

According to an embodiment, the processor 260 may calculate values of at least one first parameter for every a plurality of regions based on reference color components indicating a representative color of each of the plurality of regions (operation 705).

The processor 260 may calculate a value of a second parameter based on a first pixel value and a second pixel value of a pixel including a red filter for every the plurality of regions as shown in FIG. 9A, may calculate a value of the second parameter based on a first pixel value and a second pixel value of a pixel including a green filter for every the plurality of regions as shown in FIG. 9B, and may calculate a value of the second parameter based on a first pixel value and a second pixel value of a pixel including a blue filter for every the plurality of regions as shown in FIG. 9C (operation 707).

The processor 260 may determine a type of a predefined light source, which corresponds to data about correlationship having a value of the second parameter, which is closest to a value of the second parameter calculated for each region, among data about correlationship corresponding to each region and a value of the first parameter calculated for each region, as a type of a light source of each region (operation 709). As shown in FIG. 10, the processor 260 may determine a type of a light source for each region.

Referring to FIG. 10, there may be 2 regions, each of which has a first type 1001 as a type of a light source, there may be 9 regions, each of which has a second type 1002 as the type of the light source, and there may be 1 region having a third type 1002 as the type of the light source. According to an embodiment, the processor 260 may determine the second type occupying the highest percentage among types of the light source corresponding to 12 regions, that is, the second type occupying the highest percentage of the 12 regions, as a type of a light source of an image.

An electronic device according to an embodiment disclosed in the disclosure may include an image sensor including a pixel array, the pixel array including a plurality of pixels and each of the plurality of pixels including a first light receiving element and a second light receiving element, at least one processor electrically connected with the image sensor, and a memory storing data about correlationship between a value of at least one first parameter based on reference color components indicating a color and a value of a second parameter based on a first pixel value output from the first light receiving element and a second pixel value output from the second light receiving element, the first pixel value and the second pixel value forming the color. The data about the correlationship may correspond to each of a plurality of segmented regions of an image obtained through the image sensor and a type of a predefined light source. The memory may store instructions, when executed, causing the processor to obtain the image through the image sensor, segment the obtained image into the plurality of regions, calculate values of at least one first parameter for every the plurality of regions based on reference components indicating a representative color of each of the plurality of regions, calculate values of a second parameter for every the plurality of regions based on first pixel values output from the plurality of first light receiving elements included in each of the plurality of regions and second pixel values output from the plurality of second light receiving elements, determine a type of a light source corresponding to each of the plurality of regions based on values of the second parameter included in data about the correlationship, the values corresponding to each region and a value of the first parameter calculated for each region, and a value of the second parameter calculated for each region, and determine a type of a light source of the image based on the determined types of the light source corresponding to each of the regions.

In an embodiment, the data about the correlationship may be a three-dimensional lookup table data in which a value obtained by dividing a B value by a G value and a value Obtained by dividing an R value by the G value based on the R, G, and B values which are the reference color components indicating the color correlate with a value obtained by dividing the first pixel value forming the color by the second pixel value forming the color.

In an embodiment, the three-dimensional lookup table data may be generated based on the values of the at least one first parameter and the values of the second parameter, the values being obtained by capturing a plurality of color charts having different colors.

In an embodiment, the three-dimensional lookup table data may be generated according to at least one of regression analysis, machine learning, or a pattern recognition method using the obtained values of the at least one first parameter and the obtained values of the second parameter.

In an embodiment, the representative color of each of the plurality of regions may be determined based on pixel values in each of the plurality of regions.

In an embodiment the representative color of each of the plurality of regions may be determined based on an average value of the pixel values in each of the plurality of regions.

In an embodiment, the reference color components may be R, G, and B values, and the values of the at least one first parameter may be a value obtained by dividing the B value by the G value and a value obtained by dividing the R value by the G value.

In an embodiment, the value of the second parameter of each of the plurality of regions may be a value obtained by dividing an average value of the first pixel values output from the first light receiving elements included in each of the plurality of regions by an average value of the second pixel values output from the second light receiving elements.

In an embodiment, the instructions may cause the processor to determine a type of the predefined light source, the type corresponding to the data about the correlationship having a value of the second parameter, the value being closest to a value of the second parameter calculated for each region, among the data about the correlationship corresponding to each region and the value of the first parameter calculated for each region, as a type of a light source of each region.

In an embodiment, the instructions may cause the processor to determine a type of a light source, the type occupying the highest percentage, among types of the light source corresponding to each of the plurality of regions as the light source of the image.

A method for determining a light source of an image according to an embodiment disclosed in the disclosure may include obtaining an image by means of an image sensor including a plurality of pixels, each of which includes a first light receiving element and a second light receiving element, segmenting the obtained image into a plurality of regions, calculating values of at least one first parameter for every the plurality of regions based on reference color components indicating a representative color of each of the plurality of regions, calculating values of a second parameter for every the plurality of regions based on first pixel values output from the plurality of first light receiving elements included in each of the plurality of regions and second pixel values output from the plurality of second light receiving elements, determining a type of a light source corresponding to each of the plurality of regions based on values of the second parameter included in data about correlation ship stored in a memory, the values corresponding to each region and a value of the first parameter calculated for each region, and a value of the second parameter calculated for each region, and determining a type of a light source of the image based on the determined types of the light source corresponding to each of the regions.

In an embodiment the representative color of each of the plurality of regions may be determined according to an average value of pixel values in each of the plurality of regions.

In an embodiment, the reference color components may be R, G, and B values, and the values of the at least one first parameter may be a value obtained by dividing the B value by the G value and a value obtained by dividing the R value by the G value.

In an embodiment, the value of the second parameter of each of the plurality of regions may be a value obtained by dividing an average value of the first pixel values output from the first light receiving elements included in each of the plurality of regions by an average value of the second pixel values output from the second light receiving elements.

In an embodiment, the determining of the type of the light source corresponding to each of the plurality of regions may include determining a type of the predefined light source, the type corresponding to the data about the correlationship having a value of the second parameter, the value being closest to a value of the second parameter calculated for each region, among the data about the correlationship corresponding to each region and the value of the first parameter calculated for each region, as a type of a light source of each region.

In an embodiment, the determining of the type of the light source of the image may include determining a type of a light source, the type occupying the highest percentage, among types of the light source corresponding to each of the plurality of regions as the light source of the image.

Furthermore, an electronic device according to an embodiment disclosed in the disclosure may include an image sensor including a plurality of pixels, each of at least some of the plurality of pixels including a plurality of light receiving elements, a memory, and a processor. The processor may be configured to obtain an image using the image sensor, segment at least a portion of the image into a plurality of regions, calculate values of at least one first parameter for every the plurality of regions based on reference color components indicating a representative color of each of the plurality of regions, calculate values of a second parameter corresponding to each of the plurality of regions using first pixel values corresponding to some of the plurality of light receiving elements of each of the plurality of regions and second pixel values corresponding to some of the plurality of light receiving elements, determine types of a light source corresponding to the plurality of regions, based on comparison between the values of the first parameter and the values of the second parameter and data about correlationship of the first parameter and the second parameter corresponding to specified light sources, and correct white balance of the image, based on the determined one or more type of the light sources corresponding to the plurality of regions.

In an embodiment, the memory may store the data about the correlationship and the data about the correlationship may correspond to each of the plurality of regions.

In an embodiment, the processor may be configured to determine a representative color of each of the plurality of regions by binning pixels included in each of the plurality of regions.

In an embodiment, the processor may be configured to assign a weight to a type of a light source corresponding to at least one predetermined region among the plurality of regions and correct the white balance of the image based on the type of the light source to which the weight is assigned and a type of a light source to which the weight is not assigned.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 2340) including an instruction stored in a machine-readable storage medium (e.g., an internal memory 2336 or an external memory 2338) readable by a machine (e.g., the electronic device 2301). For example, the processor (e.g., the processor 2320) of a machine (e.g., the electronic device 2301) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

The invention claimed is:

1. An electronic device, comprising:
an image sensor including a pixel array, the pixel array including a plurality of pixels including a plurality of first light receiving elements and a plurality of second light receiving elements and each of the plurality of pixels including at least one of the plurality of first light receiving elements and at least one of the plurality of second light receiving elements;
a memory storing a lookup table related to a type of a predefined light source; and
at least one processor electrically connected with the image sensor and the memory;
wherein the memory stores instructions, which when executed, are configured to cause the processor to:
obtain an image through the image sensor;
segment the obtained image into a plurality of regions;
obtain a representative color for each of the plurality of regions;
calculate a first value and a second value using the representative color for each of the plurality of regions;
calculate a third value for each of the plurality of regions based on first pixel values output from the plurality of first light receiving elements included in each of the plurality of regions and second pixel values output from the plurality of second light receiving elements;
determine a type of a light source corresponding to the first value, the second value, and the third value using the lookup table in each of the plurality of regions; and
determine a type of a light source of the image based on the determined type of the light source,
wherein the first value is obtained by dividing a B value by a G value of the representative color,
wherein the second value is obtained by dividing an R value by the G value of the representative color, and
wherein the third value is obtained by dividing an average value of the first pixel values by an average value of the second pixel values.

2. The electronic device of claim 1, wherein the lookup table is generated based on data in which a value obtained by dividing a B value by a G value and a value obtained by dividing an R value by the G value based on the R value, the G value, and the B value of a color correlate with a value obtained by dividing a pixel value output from the first light receiving element by a pixel value output from the second light receiving element.

3. The electronic device of claim 2, wherein the lookup table is generated by capturing a plurality of color charts having different colors.

4. The electronic device of claim 3, wherein the lookup table is generated according to at least one of regression analysis, machine learning, or a pattern recognition method.

5. The electronic device of claim 1, wherein the representative color of each of the plurality of regions is determined based on pixel values in each of the plurality of regions.

6. The electronic device of claim 5, wherein the representative color of each of the plurality of regions is determined based on an average value of the pixel values in each of the plurality of regions.

7. The electronic device of claim 1, wherein the instructions cause the processor to:
determine the type of the predefined light source corresponding to a value being closest to the calculated third value, as the type of the light source.

8. The electronic device of claim 1, wherein the instructions cause the processor to:
determine the type of the light source occupying a highest percentage, among the types of the light source respectively corresponding to the plurality of regions, as the type of the light source of the image.

9. A method for determining a light source of an image, the method comprising:
storing a lookup table related to a type of a predefined light source,
obtaining an image by means of an image sensor including a plurality of pixels, each of which includes a first light receiving element and a second light receiving element;
segmenting the obtained image into a plurality of regions;
obtaining a representative color for each of the plurality of regions;
calculating a first value and a second value using the representative color for each of the plurality of regions;
calculating a third value for each of the plurality of regions based on first pixel values output from the first light receiving element included in each of the plurality of regions and second pixel values output from the second light receiving element;
determining a type of a light source corresponding to the first value, the second value, and the third value using the lookup table in each of the plurality of regions; and
determining a type of a light source of the image based on the determined type of the light source respectively corresponding to the regions,
wherein the first value is obtained by dividing a B value by a G value of the representative color,
wherein the second value is obtained by dividing an R value by the G value of the representative color, and wherein the third value is obtained by dividing an average value of the first pixel values by an average value of the second pixel values.

10. The method of claim 9, wherein the representative color of each of the plurality of regions is determined according to an average value of pixel values of each of the plurality of regions.

11. The method of claim 9, wherein determining the types of the light source respectively corresponding to the plurality of regions includes:

determining the type of the predefined light source corresponding to a value being closest to the calculated third value, as the type of the light source.

* * * * *